United States Patent
Adolphson et al.

(10) Patent No.: US 12,050,162 B2
(45) Date of Patent: Jul. 30, 2024

(54) PREFILTERS FOR PARTICLE CONCENTRATORS

(71) Applicant: INNOVAPREP LLC, Drexel, MO (US)

(72) Inventors: Alec D. Adolphson, Raymore, MO (US); Andrew E. Page, Smithton, MO (US); John D. Birkenholz, Kansas City, MO (US); David Goad, Stillwater, OK (US)

(73) Assignee: InnovaPrep, LLC, Drexel, MO (US)

( * ) Notice: Subject to any disclaimer, the term of this patent is extended or adjusted under 35 U.S.C. 154(b) by 8 days.

(21) Appl. No.: 17/726,625

(22) Filed: Apr. 22, 2022

(65) Prior Publication Data

US 2022/0341826 A1    Oct. 27, 2022

Related U.S. Application Data

(60) Provisional application No. 63/177,988, filed on Apr. 22, 2021.

(51) Int. Cl.
*B01L 3/00*     (2006.01)
*G01N 1/34*     (2006.01)

(52) U.S. Cl.
CPC .......... *G01N 1/34* (2013.01); *B01L 3/502753* (2013.01); *B01L 2300/0681* (2013.01); *B01L 2300/0832* (2013.01); *B01L 2400/0683* (2013.01)

(58) Field of Classification Search
CPC .......... G01N 1/28; G01N 1/4077; G01N 1/40; G01N 2001/4088; G01N 1/10; G01N 1/14; B01L 3/0217; B01L 2400/0478; B01L 3/502753; B01L 3/0275; B01L 3/021; B01L 2300/0681; B01L 2300/0832; B01L 2400/0683; G01L 1/34
See application file for complete search history.

(56) References Cited

U.S. PATENT DOCUMENTS

| | | | |
|---|---|---|---|
| 4,523,995 A | 6/1985 | Pall et al. | |
| 2008/0185333 A1 | 8/2008 | Gibson et al. | |
| 2010/0081209 A1* | 4/2010 | Brewer | B01L 3/0275 436/178 |
| 2012/0071643 A1 | 3/2012 | Helfer et al. | |

(Continued)

FOREIGN PATENT DOCUMENTS

| | | | |
|---|---|---|---|
| DE | 19806780 C1 * | 7/1999 | ............ B01L 3/0275 |
| KR | 101647738 B1 | 8/2016 | |
| KR | 20190018182 A * | 2/2019 | |

OTHER PUBLICATIONS

International Preliminary Report on Patentability, PCT/US2022/025862, Dated Jul. 1, 2022.

*Primary Examiner* — Jill A Warden
*Assistant Examiner* — Michael Stanley Gzybowski
(74) *Attorney, Agent, or Firm* — Moazzam & Associates, LLC

(57) ABSTRACT

Devices, systems and methods are disclosed which relate to a prefiltration device that can be used with the concentrating pipette instruments and other devices which draw a sample in through one opening and dispense a concentrated or eluted sample out through the same opening. The device allows the sample to be passed through a prefilter when entering the opening and then bypassed the prefilter when being dispensed through the same opening.

19 Claims, 6 Drawing Sheets

(56) References Cited

U.S. PATENT DOCUMENTS

2012/0164750 A1* 6/2012 Gjerde ................ G01N 1/405
　　　　　　　　　　　　　　　　　　　　　　　436/178
2015/0352543 A1* 12/2015 Dawes ................ B01L 3/0275
　　　　　　　　　　　　　　　　　　　　　　　137/511

* cited by examiner

PREFILTERS FOR PARTICLE CONCENTRATORS

This patent application claims priority to U.S. Provisional Patent Application Ser. No. 63/177,988, filed Apr. 22, 2021, the content of which is hereby incorporated by reference herein in its entirety into this disclosure.

GOVERNMENT INTERESTS

This subject disclosure was funded in-part under a NOAA SBIR contract, under contract number 1305M219CNRMW0033. The government may have certain rights in this subject disclosure.

BACKGROUND OF THE SUBJECT DISCLOSURE

Field of the Subject Disclosure

The subject disclosure relates generally to the field of sample preparation. More particularly, the subject disclosure relates to methods and devices for prefiltration of samples entering the InnovaPrep Concentrating Pipette Tip which is used in conjunction with the InnovaPrep Concentrating Pipette, as described in U.S. Pat. No. 10,955,316, pending U.S. patent application Ser. No. 17/222,951, and others, which are all incorporated by reference herein in their entirety into this disclosure. Additionally, the subject matter may be used with other similar devices that work in a similar way. The present devices enable prefiltration of samples entering the concentrating pipette, thereby enabling processing of difficult sample matrices and, thus, may be used as needed in any situation where such technique would be beneficial.

Background of the Subject Disclosure

The InnovaPrep Concentrating Pipette is used to concentrate dilute particles of interest, generally biological in nature, by drawing the sample into the bottom opening of the Concentrating Pipette Tip, capturing the particles of interest onto a membrane filter while passing the liquid portion out through a waste line, then eluting the particles of interest off of the membrane filter and out through the same bottom opening. In this way, target particles are concentrating from large sample volumes into small, concentrated sample volumes—enabling detection at very low concentrations using modern microbiological methods.

The Concentrating Pipette Tip is a single-use, disposable device and the samples being concentrated only come into contact with the disposable device while filtered waste is pulled out through the Concentrating Pipette instrument. After the sample has been fully processed, a wet foam is dispensed from the Concentrating Pipette instrument into the disposable Concentrating Pipette Tip and the now concentrated target material is dispensed from the end of the Concentrating Pipette Tip. The Concentrating Pipette Tip is then removed from the Concentrating Pipette Instrument and a new Concentrating Pipette Tip is installed for the next sample. This significantly reduces the potential for cross-contamination between samples.

In many Concentrating Pipette applications, the sample may contain non-target particles which can make processing through the Concentrating Pipette membrane filters difficult and also can result in co-concentration of the non-target particles. Co-concentration of non-target particles can negatively affect downstream steps including sample lysis, nucleic acid extraction, and molecular or other assays. These issues can make prefiltration or precentrifugation steps necessary.

While there are many prefiltration, precentrifugation or other methods that can be used to reduce target particles in samples prior to Concentrating Pipette processing, these methods are often labor intensive, manual processes and can require significant skill to perform correctly.

SUMMARY OF THE SUBJECT DISCLOSURE

In light of the reasons described above, there is a need for a prefiltration device that enables samples to be automatically prefiltered prior to passing through the Concentrating Pipette Tip, which prefiltration device can then be bypassed when a concentrated sample is dispensed.

The present disclosure addresses the problem outlined above and advances the art by providing a prefiltration device that, when coupled with the Concentrating Pipette Tip or similar devices, enables the sample to pass through the prefilter when entering the Concentrating Pipette Tip, but allows the concentrated sample to easily bypass the prefilter when dispensed.

The present application discloses devices, systems and methods which relate to a prefiltration device that can be used with, for example, the InnovaPrep Concentrating Pipette instruments and other devices which draw a sample in through one opening and dispense a concentrated or eluted sample out through the same opening. The device allows the sample to be passed through a prefilter when entering the opening and then bypassed the prefilter when being dispensed through the same opening.

The subject disclosure uses a prefilter assembly that allows a Concentrating Pipette Tip or similar device to be inserted into to create a single device that allows users to process samples through a prefilter with the sample then flowing directly into the Concentrating Pipette Tip or similar device. Once the sample has been processed the device can be readily bypassed to allow an elution fluid or elution foam to be dispensed back out of the original sample inlet without backflushing the prefilter.

To bypass the device the user pushes down on the Concentrating Pipette Tip or similar device which causes the end of the Tip to push through a foil or other seal within the device and bypass the original flow path.

In one exemplary embodiment, the present subject disclosure also contains a filter aid which reduces fouling of the prefilter and the membrane filters within the Concentrating Pipette Tip or similar device and improves the quality of the final sample dispensed from the device.

DETAILED DESCRIPTION OF THE SUBJECT DISCLOSURE

Figures 1A, 1B:
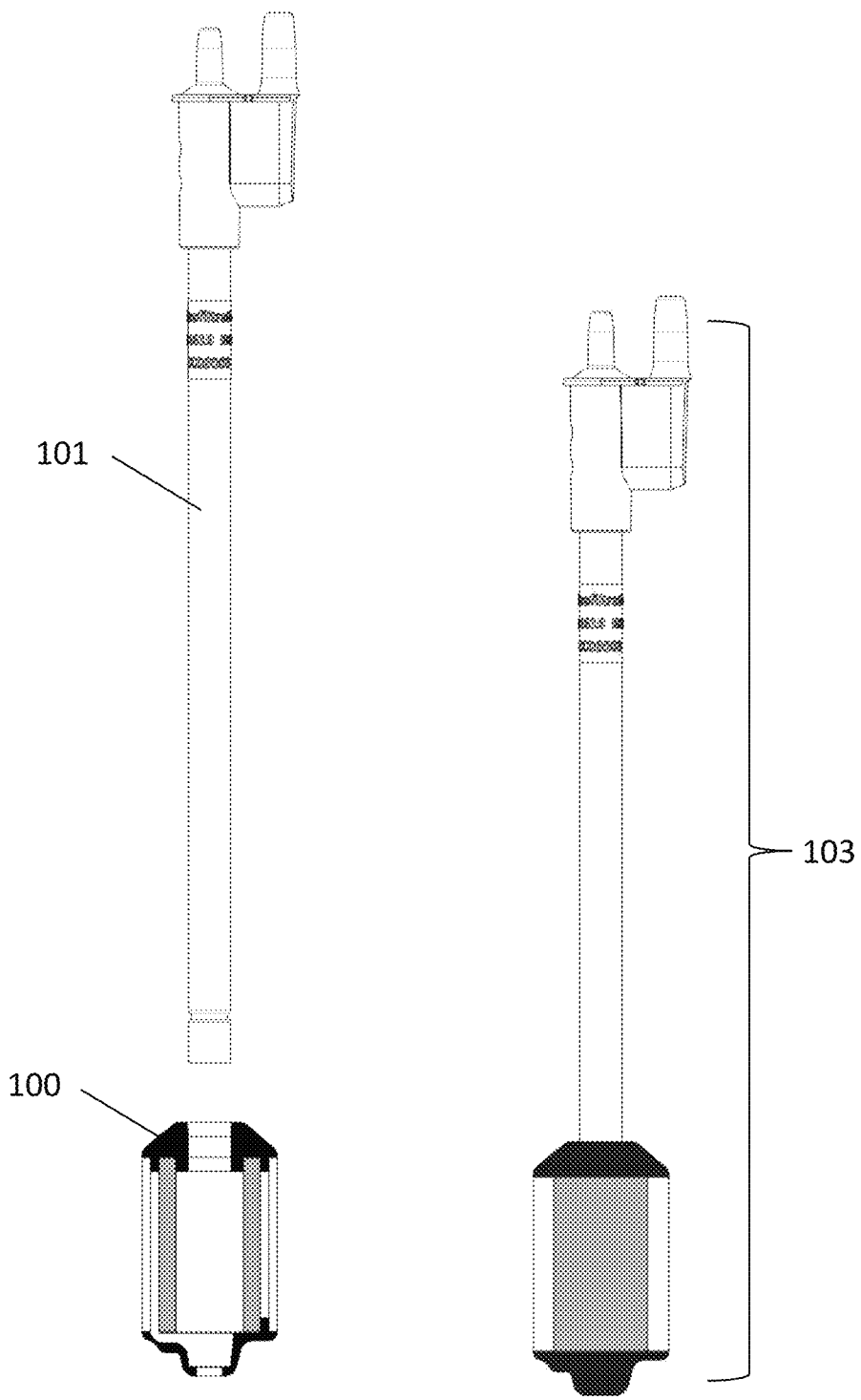
FIGS. 1A and 1B show a prefilter assembled with a hollow fiber Concentrating Pipette Tip (hf-CPT), according to an exemplary embodiment of the present subject disclosure.

The present subject disclosure is a prefilter assembly for use with concentrating pipette tips and assemblies. As a non-limiting example, the InnovaPrep disposable Concentrating Pipette Tip and Concentrating Pipette instrument are shown and described. However, the present subject disclosure is not limited to such a device or system and may be used with other devices and systems as appreciation by one having ordinary skill in the art after consideration of the present disclosure. For sake of convenience, the present subject disclosure is described with respect to the InnovaPrep devices and systems. The prefilter enables samples to be filtered as they are drawn into the Concentrating Pipette Tip and to be bypassed as a concentrated sample is dispensed from the tip.

The prefilter may be available as a stand-alone device that is attachable to a Concentrating Pipette Tip or as an assembly already attached to the Concentrating Pipette Tip. To use the prefilter, that is attached to the Concentrating Pipette Tip, the user will insert the tip into the Concentrating Pipette Tip as is normally performed. The prefilter, which is attached to the bottom end of the tip, is lowered into a sample and the Concentrating Pipette instrument operation is initiated by the user. The sample is then aspirated into prefilter assembly and through the internal prefilter and then into the Concentrating Pipette Tip.

At the end of sample processing the user is requested to perform a wash step or to elute the sample. The wash step can be used if desired or the user can go directly to elution. The wash step is used, when desired, to improve the buffer exchange that takes place during a Concentrating Pipette run, by allowing residual sample liquid and debris to be removed prior to elution. To perform a wash step a new fluid is selected that will enable residual sample liquid, soluble material and particles smaller than the Concentrating Pipette Tip membrane filter pore size to be efficiently passed through the membrane filter. This fluid can be water, phosphate buffered saline, tris buffer, all with or without the addition of a surfactant like Tween 20, or any other liquid or buffer selected from those commonly used in microbiology and molecular biology.

A volume of wash fluid in the range of 1 mL to 1 L, or more preferably 5 mL to 250 mL, is placed into the original sample container or into an appropriate sized second container and placed onto the Concentrating Pipette tray. The user then lowers the prefilter, which is attached onto the Concentrating Pipette Tip, as described above, into the container holding the wash fluid.

With the prefilter present the user then pushes down solidly on the head of the Concentrating Pipette instrument to push the bottom opening of the Concentrating Pipette Tip through a pierceable foil seal, or other pierceable seal or self-opening/self-sealing device such as a check valve, inside of the prefilter assembly and into a pocket in the bottom of the assembly. This action changes the flow path within the prefilter assembly to allow wash fluid to bypass the prefilter as it is drawn into the Concentrating Pipette Tip or concentrate eluant to bypass the prefilter and be dispensed directly out of the bottom of the Concentrating Pipette Tip and through the prefilter assembly and into a sample container.

After pushing down on the Concentrating Pipette instrument head and thereby pushing the bottom opening of the Concentrating Pipette Tip through the foil septum and into the pocket the user is ready to perform a wash step or elution. To perform a wash step the user presses the wash step button on the Concentrating Pipette user interface. The instrument elution foam valve is then initiated to fill the Concentrating Pipette Tip retentate volume with some volume of liquid, to allow the membranes to begin to flow liquid again, and the pump is automatically initiated and wash fluid begins to flow into the prefilter assembly opening and then into the Concentrating Pipette Tip. When the entire wash fluid is processed the instrument flow sensor determines that the wash process is complete and again alerts to the user to initiate a second wash step or to perform an elution. If a wash step was performed the user may immediately perform an elution using the standard Concentrating Pipette process, because the tip has already been pushed through the pierceable foil seal in the prefilter.

To go directly to an elution, without a wash step, the user pushes down solidly on the head of the Concentrating Pipette instrument to push the bottom opening of the Concentrating Pipette Tip through a pierceable foil seal inside of the prefilter assembly and into a pocket in the bottom of the assembly. The user then presses the elution button on the Concentrating Pipette user interface and is asked to place a new sample container under the Concentrating Pipette tip opening. This is done by either placing a container on the Concentrating Pipette sample tray and lowering the head such that the tip is in the opening or raising the head and holding a sample container under the tip opening. The user is then asked to press a second button to start the elution process.

During the elution a series of pump and valve actions are performed and then wet foam is released into the top retentate port of the Concentrating Pipette Tip. The wet foam then travels through the retentate space and target particles are washed from the retentate surface of the membrane filter and travel down and out through the bottom opening of the Concentrating Pipette tip and prefilter assembly. The concentrate volume is then dispensed into the provided sample container.

The prefilter described above may be a nonwoven filter or a membrane filter or the two types may be used in combination. Nonwoven or fiber filters are commonly selected from one or more of a range of materials including, but not limited to: glass fiber, quartz fiber, cellulose, polyester, polypropylene, polyethylene, polyamides, polyimides, and acrylics. Other materials may also be selected for production of nonwoven of fiber filters that will be apparent to those skilled in the art. These materials may be formed into an appropriate prefilter using a range of forming processes that will be known by those skilled in the art, including, but not limited to: airlaid, drylaid, melt spun, spunbond, meltblown, web spinning, wetlaid, and composite structures. Further these filters may contain polymeric binder resins which help in maintaining the integrity of the filter and especially improving the wet strength of the filter material. Binders can be selected from a range of materials that will be known to those skilled in the art.

Membrane filters can be selected from a list of membrane filter types that are readily available including, but not limited to: mixed cellulose esters (ME), cellulose acetate, cellulose nitrate, polyethersulfone (PES), polysulfone (PS), polypropylene (PP), polyacrylonitrile (PAN), hydrophilic polydivinylidene fluoride (PVDF), polytetrafluoroethylene (PTFE), Polyethylene terephthalate, polyethylene, polyester, polyimide, and other materials such as stainless steel and ceramics. Both hydrophobic and hydrophilic materials may be used. Other membrane filter types that will be known to or appreciated by those skilled in the art may also be used for the prefilter.

The prefilter material is selected such that it allows non-target particles, larger than the range of target particle sizes, to be removed while allowing the target particles to pass through and enter into the Concentrating Pipette Tip. In this way, fouling of the Concentrating Pipette Tip is reduced and the amount of co-concentrated material present in the concentrate is reduced. Overcoming these issues is helpful to use of the Concentrating Pipette in applications with larger concentrations of non-target particles in the samples. Fouling can cause very long run times, shut down of the process due to low flow rate—requiring the user to restart the process, or complete fouling of the Concentrating Pipette Tip and shut down of the processing run. Further, co-concentration can result in poor efficiency or failure of lysis, nucleic acid extraction or detection. These failures can occur in any downstream processing step including sample preparation or sample detection steps due to inhibitor or fouling issues associated with large amounts of co-concentrated material. Additionally, removal of larger amounts of non-target particles may result in improved sensitivity for the detection platform.

Applications for use include, but are not limited to: wastewater monitoring, wastewater epidemiology, food safety, food quality, environmental water, drinking water, product quality, indicator organism monitoring, recreational water, forensics, pharmaceutical manufacturing quality, animal health, aquaculture, clinical diagnostics and biodefense.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

In the following figures, there will be shown and described multiple configurations of disposable concentrating pipette tips and prefilters which may be used to concentrate biological particles into a reduced liquid volume.

FIGS. 1A and 1B show a prefilter 100 assembled with a hollow fiber Concentrating Pipette Tip (hf-CPT) 101, according to an exemplary embodiment of the present subject disclosure.

Prefilter 100 includes a disposable prefilter assembly that may be assembled from plastic molded, plastic extruded and fiber filter components. CPT 101 may be inserted into prefilter 100 during manufacturing or by the end user as is shown by CPT/Prefilter Assembly 103. CPT/Prefilter Assembly 103 can be inserted into a Concentrating Pipette instrument and used in a similar fashion to a commercially available Concentrating Pipette Tip without prefilter. To use the CPT/Prefilter Assembly 103 the user follows the standard Concentrating Pipette instructions but prior to performing a wash step or elution the user pushes down on the head of the Concentrating Pipette to break an internal foil seal which allows the prefilter to be bypassed during these operations.

Figures 2A, 2B:
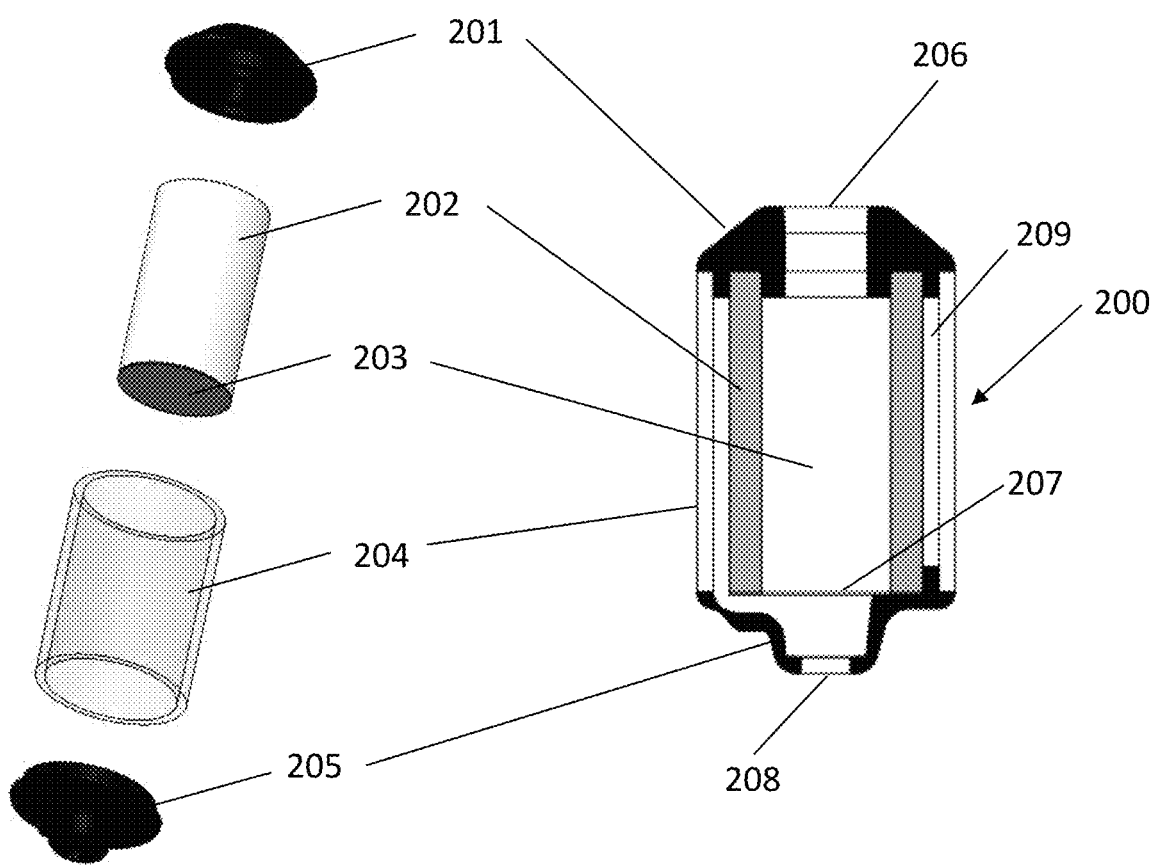
FIG. 2A shows an exploded view of a prefilter, according to an exemplary embodiment of the present subject disclosure.
FIG. 2B shows a cutaway view of the prefilter, according to an exemplary embodiment of the present subject disclosure.

FIG. 2A shows an exploded view of a prefilter and FIG. 2B shows a cutaway view of the same prefilter according to an exemplary embodiment of the present subject disclosure.

Prefilter 200 includes a top end-cap 201, filter 202, filter lumen 203, enclosure 204, bottom end-cap 205, top port 206, foil seal 207, bottom opening 208, and outside annular space 209 formed between filter 202 and enclosure 204. A Concentrating Pipette Tip is inserted into top port 206 until it nearly touches foil seal 207. This can be done during manufacturing or immediately before use. The bottom opening of the Concentrating Pipette Tip is positioned in the range of 0.5 mm to 5 cm from the surface of the foil seal 207, or more preferably between 1 mm to 5 mm from the surface. This distance creates a correctly sized flow path between the foil seal 207 and the opening of the Concentrating Pipette Tip but is also far enough away from the foil seal 207 to keep the seal from being stuck onto the Tip opening during operation. In this case the top-end cap can be fashioned to be sufficiently tight so as to reduce the chance of a Concentrating Pipette Tip that is inserted into top port 206 from accidentally moving down until it touches the foil. Alternatively the top port 206 may be temporarily bonded to the shaft of the Concentrating Pipette Tip to ensure it will not move until the user is read to push it through the foil.

The foil seal 207 can be produced from any number of commercially available pierceable foil seals and may be bonded to the bottom of the filter any number of methods that will be known by those skilled in the art. A partial listing of these processes includes, but is not limited to, adhesives, ultrasonic, spin weld, thermal weld, vibrational welding, overmolding, and potting.

Bottom end-cap 205 and top-end cap 201 can be produced using standard injection molding processes or other manufacturing processes known by those skilled in the art. Enclosure 204 can be produced using extrusion or injection molding processes or other manufacturing processes known by those skilled in the art. Further, enclosure 204 and bottom end-cap 205, or enclosure 204 and top end-cap 201 may be produced as a single part using standard injection molding processes.

Filter 202 can be a non-woven or fiber filter or may be of another filter type such as woven filter, membrane filter or a screen material. The fibers or materials can be a single material or multiple materials in a range of ratios. Appropriate materials include, but are not limited to, glass, quartz, metal, cotton, various cellulosic or other natural fibers, synthetic fibers including nylon, polypropylene, rayon, acrylic, polyolefin, aramide, polyester, polytetrafluoroethylene, or any number of materials commonly used in filter production. The filter may contain a binder material or may be free of binder materials. The filter can contain a support structure or be self-supporting and can be tubular in nature or may contain pleats. Further, filter 202 can be modified using known techniques to chemically or physically coat or impregnate the filters used in the assembly with filter aids such as diatomaceous earth, polyvinyl polypyrrolidone, or other materials capable of capturing fouling materials or materials that are capable of causing inhibition in downstream assays. Further, it is possible that the interstitial space formed between enclosure 204 and filter 202 may be filled with a filter aid, molecular sieve, silica gel, polyvinyl polypyrrolidone, diatomaceous earth, perlite, cellulose, clay, or cotton fiber or other material, that will be well known to those skilled in the art, to reduce fouling of the filter 202 and to reduce passage of natural organic matter, proteins, polysaccharides, humin, humic acids, fulvic acids and other small particles and compounds that can pass through the filter 202. These small particles may cause fouling of the filter 202 or the Concentrating Pipette Tip membrane filter, or they maybe be co-concentrated and cause issues with downstream assays.

Standard manufacturing techniques can be used for final assembly of prefilter 200. Filter 202 may be held in place and sealed within the assembly by pressure applied with the entire assembly is bonded together. Filter 202 may also contain "crush zones" at the end of the filter or may be plastisol-dipped or sealed at each end using a gasket material. Further the filter may be permanently bonded in place using an epoxy or other adhesive or an adhesive tape material. Finally, a "raceway" in the inside of Bottom end-cap 205 and top-end cap 201 can be used to provide a tight seal of the filter when the assembly is bonded together. Any method traditionally used for sealing tubular or round pleated filters, that will be well known to those skilled in the art, can be used to seal the filter 202 into the assembled prefilter 200.

Bottom end-cap 205, top-end cap 201, and enclosure 204 can be bonded together using any number of processes for bonding injection molded and extruded plastic components that will be known by those skilled in the art. A partial listing of these processes include, but are not limited to, adhesives, ultrasonic, spin weld, thermal weld, vibrational welding, overmolding, and potting.

To use prefilter 200, which is attached to a Concentrating Pipette Tip, the user will insert the Concentrating Pipette Tip into the Concentrating Pipette instrument as is normally performed. The prefilter 200, which is attached to the bottom end of the tip, is then lowered into a sample and the Concentrating Pipette instrument sample processing operation is initiated by the user. Upon initiation of a sample processing run, the sample is aspirated into prefilter 200 through bottom opening 208. The sample then flows into outside annular space 209, which is formed between filter 202 and enclosure 204. The sample the flows through filter 202. Large particles are captured onto the surface of filter 202 and within the porous structure of filter 202, while a significant percentage of smaller target particles pass through. After flowing through filter 202 and into a similar annular space created between the inside wall of filter 202 and the outside wall of the Concentrating Pipette Tip the sample is drawn into the bottom opening of the Concentrating Pipette Tip. The smaller target particles are then captured within the lumen of hollow fiber membrane filters in the Concentrating Pipette Tip.

After the entire sample has been processed and the sample processing run has been stopped by the Concentrating Pipette instrument, the user pushes firmly on the head of the Concentrating Pipette instrument which causes the bottom tip of the Concentrating Pipette Tip to break through foil seal 207 and seal inside of walls of bottom end-cap 205 just above bottom opening 208. In this position, the user may then initiate an elution of the Concentrating Pipette Tip using the standard Concentrating Pipette instrument process. Upon initiating the elution, wet foam is push down the lumen of hollow fiber membrane filters within the Concentrating Pipette Tip, recovering captured particles and being dispense out of bottom opening 208.

Figures 3A, 3B:
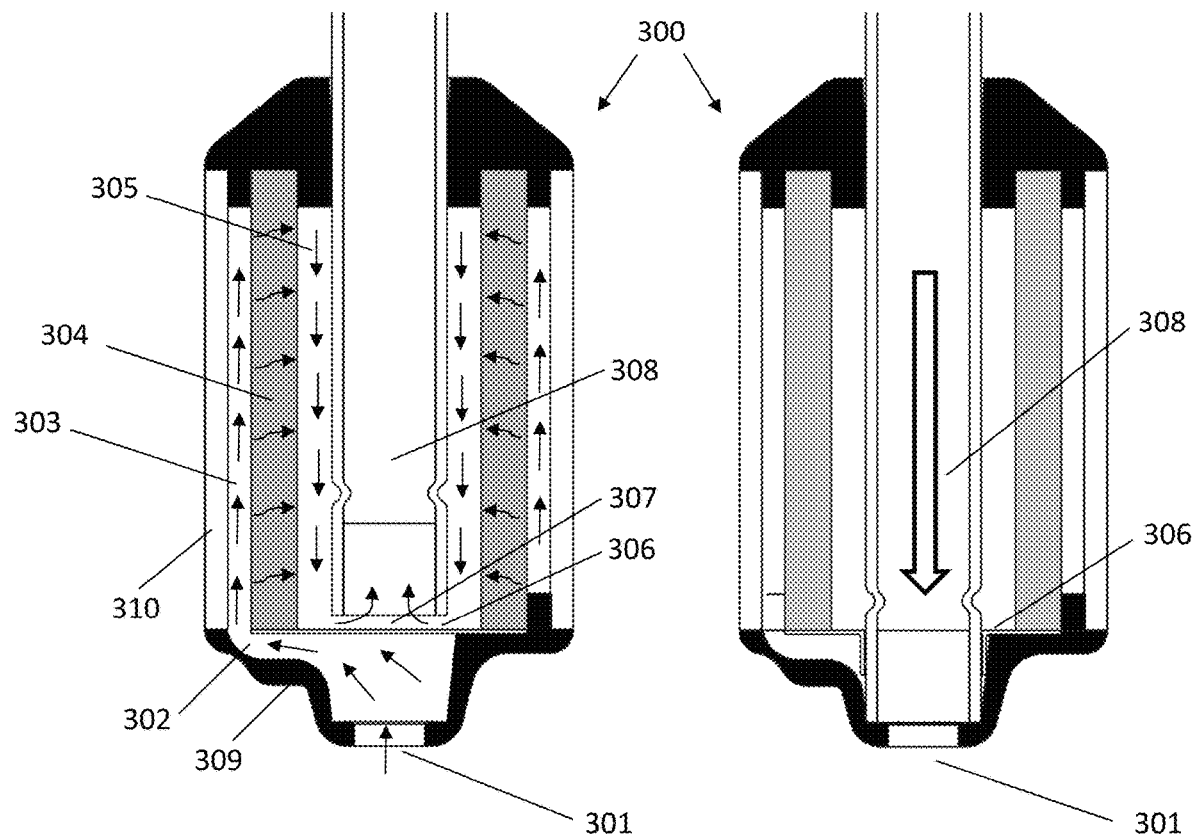
FIGS. 3A and 3B show flow through an assembled prefilter, according to an exemplary embodiment of the present subject disclosure.

FIGS. 3A and 3B show cross sections of prefilter 300, which is substantially the same device as that shown in FIGS. 2A and 2B. Prefilter 300 is attached by sliding the shaft 308 of a Concentrating Pipette Tip through the top of the prefilter 300. The Concentrating Pipette Tip and Prefilter 300 assembly is designed to be used with Concentrating Pipette instrument but may be used with other devices and systems that include filtration of an air or liquid airstream when flowing in one direction and bypass of said filter when flowing in the other direction. Check valves may also be used to enable flow through a filter in one direction with bypass of the filter in the other, but check valves generally require, although relatively small, a pressure drop to open and allow air or liquid to flow. The pressure drop associated with check valves may be problematic in the case of the Concentrating Pipette because pressure against the foam outlet flow during wet foam elution can result in reduced efficiency when recovery particles.

Fluid flow though prefilter 300 is represented by the arrows. Fluid flow, which is generally a liquid, is initiated by a pump in the Concentrating Pipette instrument drawing air out of the Concentrating Pipette Tip outlet. Air is drawn into the prefilter 300 through opening 301 and subsequently the liquid sample is aspirated into opening 301. The liquid sample then flows through outside annular space opening 302, which may be a single opening or multiple openings or may extend around the circumference of bottom end-cap 309. The sample continues to flow into the outside annular space 303, which is formed between filter 304 and enclosure 310, and then through filter 304 and into inside annular space 305. Inside annular space 305 is created between filter 304 and the outside wall of Concentrating Pipette Tip 308. The liquid then flows down and into space 307, above foil seal 306, before flowing up and into the opening of Concentrating Pipette Tip 308.

During this process, particles generally larger than the pore size of filter 304 are retained on the surface or within the structure of filter 304. Particles and soluble materials that are smaller than the pore size of filter 304 are generally able to pass through filter 304 and eventually enter the opening at the bottom of Concentrating Pipette Tip 308. The particles are then captured within the lumen of hollow fiber membrane filters in Concentrating Pipette Tip 308.

Once the entire sample volume has been processed, a flow sensor within the Concentrating Pipette instrument is used to alert the user to the fact that no liquid is flowing and sample processing is complete. The user will then push down on the manifold head of the Concentrating Pipette instrument, causing the inlet tip at the bottom of the Concentrating Pipette Tip 308 to push through foil seal 306 and into bottom end-cap 309. The foil seal 306 is a thin, pierceable aluminum foil that is bonded, by pressure or temperature sensitive adhesive to the bottom of filter 304. The inlet tip of Concentrating Pipette Tip 308 is then tightly fit or sealed within the inner walls of bottom end-cap 309 just above opening 301. The user can then follow user prompts on the screen of the Concentrating Pipette instrument and initiate an elution. Wet foam then travels down the lumen of hollow fiber membrane filters within the Concentrating Pipette Tip 308 and is dispensed out of opening 301 and into a sample container.

At the end of sample processing, the user interface screen of the Concentrating Pipette instrument prompts the user to perform a wash step or to elute the sample. The wash step can be used if desired or the user can go directly to elution. The wash step is used, when desired, to improve the buffer exchange that takes place during a Concentrating Pipette run, by allowing residual sample liquid and debris to be removed prior to elution. To perform a wash step, a new fluid is selected that will enable residual sample liquid, soluble material and particles smaller than the Concentrating Pipette Tip 308 membrane filter pore size to be efficiently passed through the membrane filter. This fluid can be water, phosphate buffered saline, tris buffer, all with or without the addition of a surfactant like Tween 20, or any other liquid or buffer selected from those commonly used in microbiology and molecular biology.

A volume of wash fluid in the range of 1 mL to 1 L, or more preferably 5 mL to 250 mL, is placed into the original sample container or into an appropriate sized second container and placed onto the Concentrating Pipette tray. The user then lowers the prefilter 300, which is attached onto the Concentrating Pipette Tip 308, as described above, into the container holding the wash fluid.

With the prefilter 300 present the user, as described above, first pushes down solidly on the head of the Concentrating Pipette instrument to push the bottom opening of the Concentrating Pipette Tip 308 through a pierceable foil seal 306 inside of the prefilter 300 assembly and into a pocket in the bottom end-cap 309 of the prefilter 300. This action changes the flow path within the prefilter 300 assembly to allow wash fluid to bypass the prefilter 300 as it is drawn into the Concentrating Pipette Tip 308 or concentrate eluant to bypass the prefilter 300 and be dispensed directly out of the bottom of the Concentrating Pipette Tip 308 and through the prefilter 300 inlet 301 and into a sample container.

After pushing down on the Concentrating Pipette instrument head and thereby pushing the bottom opening of the Concentrating Pipette Tip 308 through the foil septum and into the pocket, the user is ready to perform a wash step or elution. To perform a wash step the user presses the wash step button on the Concentrating Pipette user interface. The instrument elution foam valve is then initiated to fill the Concentrating Pipette Tip 308 retentate volume with some volume of liquid, to allow the membranes to begin to flow liquid again, and the pump is automatically initiated, and wash fluid begins to flow into the prefilter 300 assembly opening and then into the Concentrating Pipette Tip 308. When the entire wash fluid is processed the instrument flow sensor determines that the wash process is complete and again alerts to the user to initiate a second wash step or to perform an elution. If a wash step was performed the user may immediately perform an elution using the standard Concentrating Pipette process, because the Concentrating Pipette Tip 308 has already been pushed through the pierceable foil seal 306 in the prefilter 300.

To go directly to an elution, without a wash step, the user pushes down solidly on the head of the Concentrating Pipette instrument to push the bottom opening of the Concentrating Pipette Tip 308 through a pierceable foil seal inside of the prefilter 300 assembly and into a pocket in the bottom end-cap 309. The user then presses the elution button on the Concentrating Pipette user interface and is asked to place a new sample container under the Concentrating Pipette Tip 308 opening. This is done by either placing a container on the Concentrating Pipette sample tray and lowering the head such that inlet 301 is in the sample container opening or raising the head and holding a sample container under inlet 301. The user is then asked to press a second button to start the elution process.

During the elution, a series of pump and valve actions are performed and then wet foam is released into the top retentate port of the Concentrating Pipette Tip. The wet foam then travels through the retentate space and target particles are washed from the retentate surface of the membrane filter and travel down and out through inlet 301. The concentrate volume is then dispensed into the provided sample container.

Figures 4A, 4B:
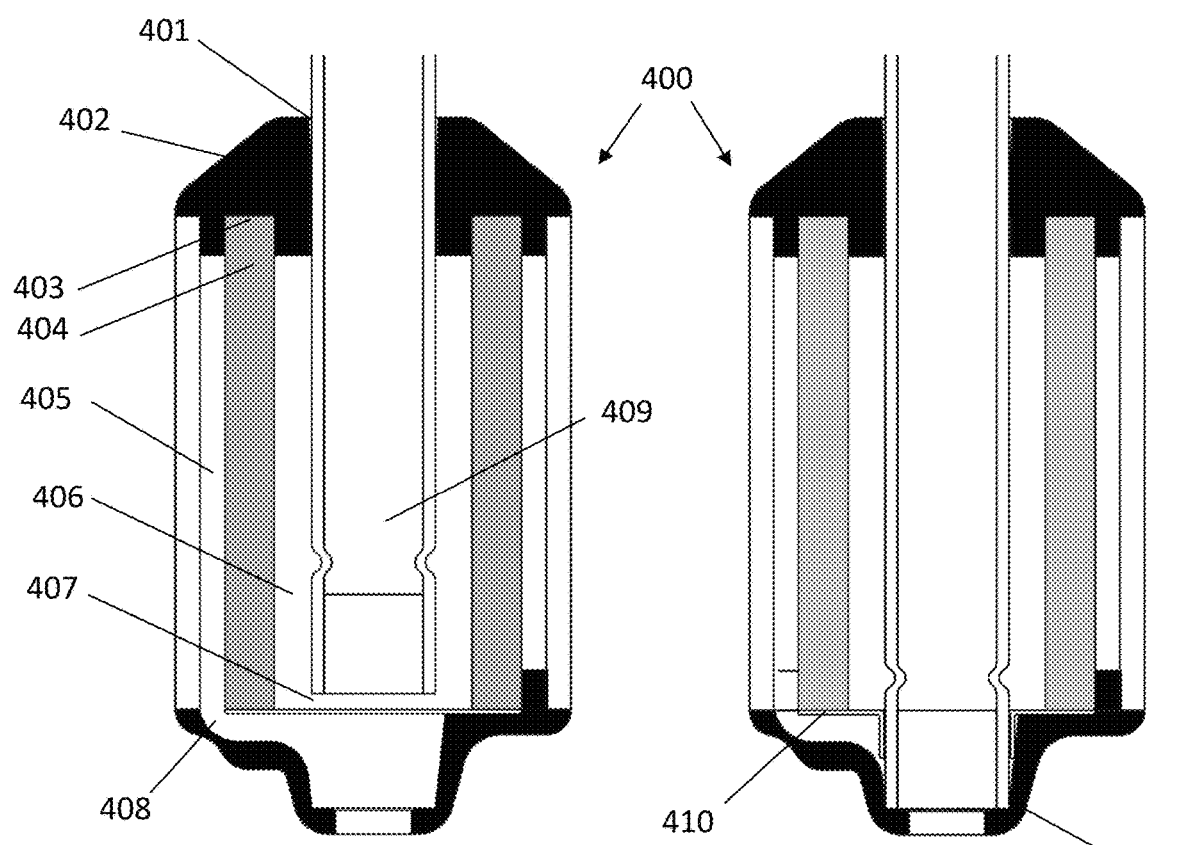
FIGS. 4A and 4B show cross section views of a prefilter assembly with pipette tip position, according to an exemplary embodiment of the present subject disclosure.

FIGS. 4A and 4B show cross sections of prefilter 400, which is substantially the same device as that shown in FIGS. 3A and 3B. FIGS. 4A and 4B are included to enable description of some specific design features to be considered. Airtight seals are needed at the following locations: shaft interface 401 between top end-cap 402 and Concentrating Pipette Tip Shaft 409, filter interface 403 between filter 404 and top end-cap 402, between filter 404 and foil seal 410 to ensure proper flow. A good, but less than airtight seal can be afforded at pocket 411. Spacing for fluid flow needs to be considered at outside annular space opening 408, outside annular space 405, internal annular space 406 and above foil seal flow path 407 to eliminate bubbles forming and ensure adequate flow.

Figures 5A, 5B:
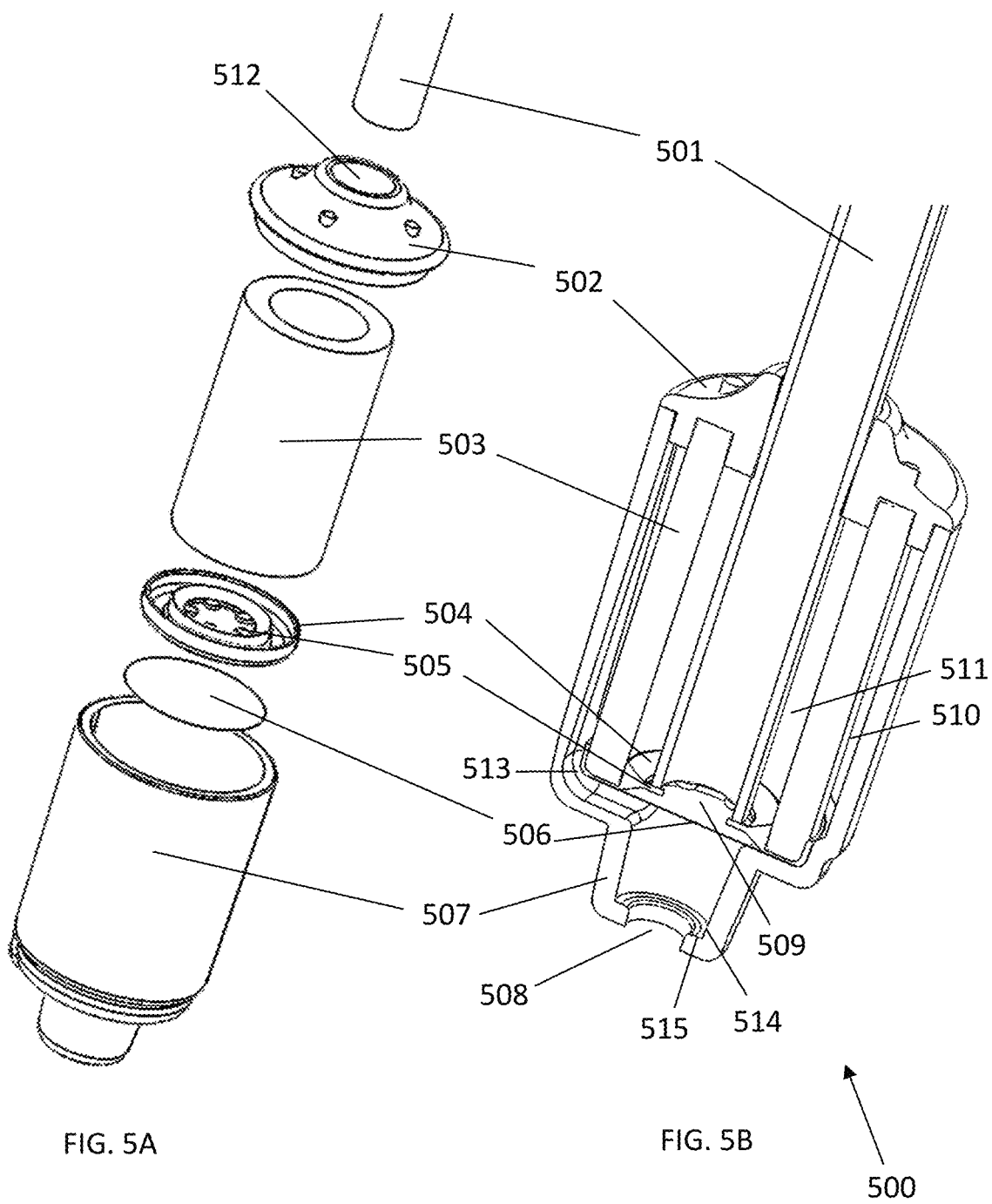
FIG. 5A shows an exploded view of a prefilter assembly, according to an exemplary embodiment of the present subject disclosure.
FIG. 5B shows a cross section view of a prefilter assembly, according to an exemplary embodiment of the present subject disclosure.

FIG. 5A shows an exploded view of a prefilter 500 and FIG. 5B shows a cutaway view of an alternative exemplary embodiment of the present subject disclosure that contains stop 505 to prevent or minimize the Concentrating Pipette Tip 501 inlet from getting blocked by foil seal 506 during sample processing.

Prefilter 500 includes a top end-cap 502, filter 503, bottom filter seal 504, Concentrating Pipette Tip stop 505, foil seal 506, enclosure 507, prefilter inlet 508, Concentrating Pipette Tip inlet 509, outside annular space 510 formed between filter 503 and enclosure 507, inside annular space 511 formed between filter 503 and outside wall of Concentrating Pipette Tip 501, flow path 513, internal pocket 514, and internal pocket stop 515. A Concentrating Pipette Tip 501 is inserted into top port 512 until it touches Concentrating Pipette Tip stop 505. Concentrating Pipette Tip stop 505 includes features that are designed to position inlet 509 of Concentrating Pipette Tip 501 a predetermined or acceptable correct distance from foil seal 506.

Concentrating Pipette Tip stop 505 is used to correctly position inlet 509 of Concentrating Pipette Tip 501 in the range of 0.5 mm to 1 cm from the surface of foil seal 506, or more preferably between 1 mm to 5 mm from the surface. This distance creates a correctly sized flow path between the foil seal 506 and the opening of the Concentrating Pipette Tip 501 but is also far enough away from the foil seal 506 to keep the foil seal 506 from being stuck onto inlet 509 during operation. Correct sizing of this and other flow paths within prefilter 500 enables air present in the flow paths at the start of a sample processing run to be fully swept out and replaced by liquid and for liquid present in the channels at the end of a sample processing run to also be fully swept out and replaced by air. It should be noted that the flow path dimension provided above are related to the currently available InnovaPrep Concentrating Pipette Tips which support flow rates of up to about 200 mL/min. As will be understood by those knowledgeable in the art, significantly larger Concentrating Pipette Tips can be readily constructed and prefilters for these can also be constructed. As such, the flow path dimensions will also scale as the size of the Concentrating Pipette Tip is scaled.

Concentrating Pipette Tip stop 505, as described above, is used to correctly position opening 509 above foil seal 506 and to keep the tip from moving closer to foil seal 506 prior to or during sample processing. Concentrating Pipette Tip stop 505 is made up of a plurality of tabs that extend into the center hole of bottom filter seal 504. Bottom filter seal 504 along with Concentrating Pipette Tip stop 505 can be produced from injection molding or other appropriate manufacturing techniques such as laser cutting from a plastic sheet, blow molding, roto molding and other techniques that will be well known to those knowledgeable in the art. The tabs that make up Concentrating Pipette Tip stop 505 are designed to prevent the Concentrating Pipette Tip 501 from moving prior to or during operation, but can also bend or break, and thus allow Concentrating Pipette Tip 501 to be pushed down and through foil seal 506 and into enclosure 507. This is performed by the user pushing down on the manifold head of the Concentrating Pipette instrument, which holds the Concentrating Pipette Tip 501, while enclosure 507 of prefilter 500 is pushed against the inside bottom of a final sample container. The tabs that make up Concentrating Pipette Tip stop 505 are designed to hold against a light downward pressure on the Concentrating Pipette Tip 501, but bend or break when a reasonable downward force is placed onto the Concentrating Pipette Tip 501 while the prefilter 500 is held against the inside bottom of the sample container.

After breaking through foil seal 506, the Concentrating Pipette Tip 501 continues to travel down until it stops against internal pocket stop 515 and seals against the walls of internal pocket 514 at the bottom of enclosure 507. Enclosure 507 is designed such that after coming out of opening 509 of Concentrating Pipette Tip 501 elution fluid or wet foam then immediately comes out of opening 508.

The foil seal 506 can be produced from any number of commercially available pierceable foil seals and may be bonded to the bottom of the filter any number of methods that will be known by those skilled in the art. A partial listing of these processes includes, but is not limited to, adhesives, ultrasonic, spin weld, thermal weld, vibrational welding, overmolding, and potting.

The tabs that make up Concentrating Pipette Tip stop 505 are designed to prevent the Concentrating Pipette Tip 501 from moving prior to or during operation, but can also bend or break, and thus allow Concentrating Pipette Tip 501 to be pushed down and through foil seal 506 and into enclosure 507. This is performed by the user pushing down on the manifold head of the Concentrating Pipette instrument, which holds the Concentrating Pipette Tip 501, while enclosure 507 of prefilter 500 is pushed against the inside bottom of a final sample container. The tabs can be further modified in length or shape and may be of differing lengths or numbers such that the tabs assist in tearing the foil and thus keeping the Concentrating Pipette Tip 501 from punching a piece of the foil out. If a piece of foil is punched out it can partially or fully block opening 508. Therefor the tabs of Concentrating Pipette Tip stop 505 can be designed with a point on one or more of the tabs and can be designed of differing lengths to ensure proper tearing of the foil.

Bottom end-cap 505 and top-end cap 502 can be produced using standard injection molding processes or other manufacturing processes known by those skilled in the art. Enclosure 507 can be produced using extrusion or injection molding processes or other manufacturing processes known by those skilled in the art. Further, enclosure 507 and bottom end-cap 505, or enclosure 507 and top end-cap 502 may be produced as a single part using standard injection molding processes.

Filter 502 can be a non-woven or fiber filter or may be of another filter type such as woven filter, membrane filter or a screen material. The fibers or materials can be a single material or multiple materials in a range of ratios. Appropriate materials include, but is not limited to, glass, quartz, metal, cotton, various cellulosic or other natural fibers, synthetic fibers including nylon, polypropylene, rayon, acrylic, polyolefin, aramide, polyester, polytetrafluoroethylene, or any number of materials commonly used if filter production. The filter may contain a binder material or may be free of binder materials. The filter can contain a support structure or be self-supporting and can be tubular in nature or may contain pleats. Further, filter 502 can be modified using known techniques to chemically or physically coat or impregnate the filters used in the assembly with filter aids such as diatomaceous earth, polyvinyl polypyrrolidone, or other materials capable of capturing fouling materials or materials that are capable of causing inhibition in downstream assays. Further, it is possible that the interstitial space formed between enclosure 507 and filter 503 may be filled with a filter aid, molecular sieve, silica gel, polyvinyl polypyrrolidone, diatomaceous earth, or other material to reduce fouling of the filter 503 and to reduce passage of natural organic matter, proteins, polysaccharides, humin, humic acids, fulvic acids and other small particles and compounds that can pass through the filter 503. These small particles may cause fouling of the filter 503 or the Concentrating Pipette Tip membrane filter, or they maybe be co-concentrated and cause issues with downstream assays.

Standard manufacturing techniques can be used for final assembly of prefilter 500. Filter 503 may be held in place and sealed within the assembly by pressure applied with the entire assembly is bonded together. Filter 503 may also contain "crush zones" at the end of the filter or may be plastisol-dipped or sealed at each end using a gasket material. Further the filter 503 may be permanently bonded in place using an epoxy or other adhesive or an adhesive tape material. Finally, a "raceway" in the inside of Bottom end-cap 505 and top-end cap 502 can be used to provide a tight seal of the filter when the assembly is bonded together. Any method traditionally used for sealing tubular or round pleated filters, that will be well known to those skilled in the art, can be used to seal the filter 503 into the assembled prefilter 500.

Bottom end-cap 505, top-end cap 502, and enclosure 507 can be bonded together using any number of processes for bonding injection molded and extruded plastic components that will be known by those skilled in the art. A partial listing of these processes include, but are not limited to, adhesives, ultrasonic, spin weld, thermal weld, vibrational welding, overmolding, and potting.

To use prefilter 500, which is attached to a Concentrating Pipette Tip, the user inserts the Concentrating Pipette Tip into the Concentrating Pipette instrument as is normally performed. The prefilter 500, which is attached to the bottom end of the tip, is then lowered into a sample, and the Concentrating Pipette instrument sample processing operation is initiated by the user. Upon initiation of a sample processing run, the sample is aspirated into prefilter 500 through bottom opening 508. The sample then flows through internal flow path 513 and into outside annular space 510, which is formed between filter 503 and enclosure 507. The sample the flows through filter 503. Large particles are captured onto the surface of filter 503 and within the porous structure of filter 503, while a significant percentage of smaller target particles pass through. After flowing through filter 503 and into a similar annular space 511 created between the inside wall of filter 503 and the outside wall of the Concentrating Pipette Tip, the sample is drawn into the bottom opening 509 of the Concentrating Pipette Tip. The smaller target particles are then captured within the lumen of hollow fiber membrane filters in the Concentrating Pipette Tip.

After the entire sample has been processed and the sample processing run has been stopped by the Concentrating Pipette instrument, the user pushes firmly on the head of the Concentrating Pipette instrument which causes the bottom tip of the Concentrating Pipette Tip to break through foil seal 506 and seal inside of walls of bottom internal pocket 514 and against internal pocket stop 515, just above bottom opening 508. In this position, the user may then initiate an elution of the Concentrating Pipette Tip using the standard Concentrating Pipette instrument process. Upon initiating the elution, wet foam is push down the lumen of hollow fiber membrane filters within the Concentrating Pipette Tip, recovering captured particles and being dispense out of bottom opening 508.

Figure 6:
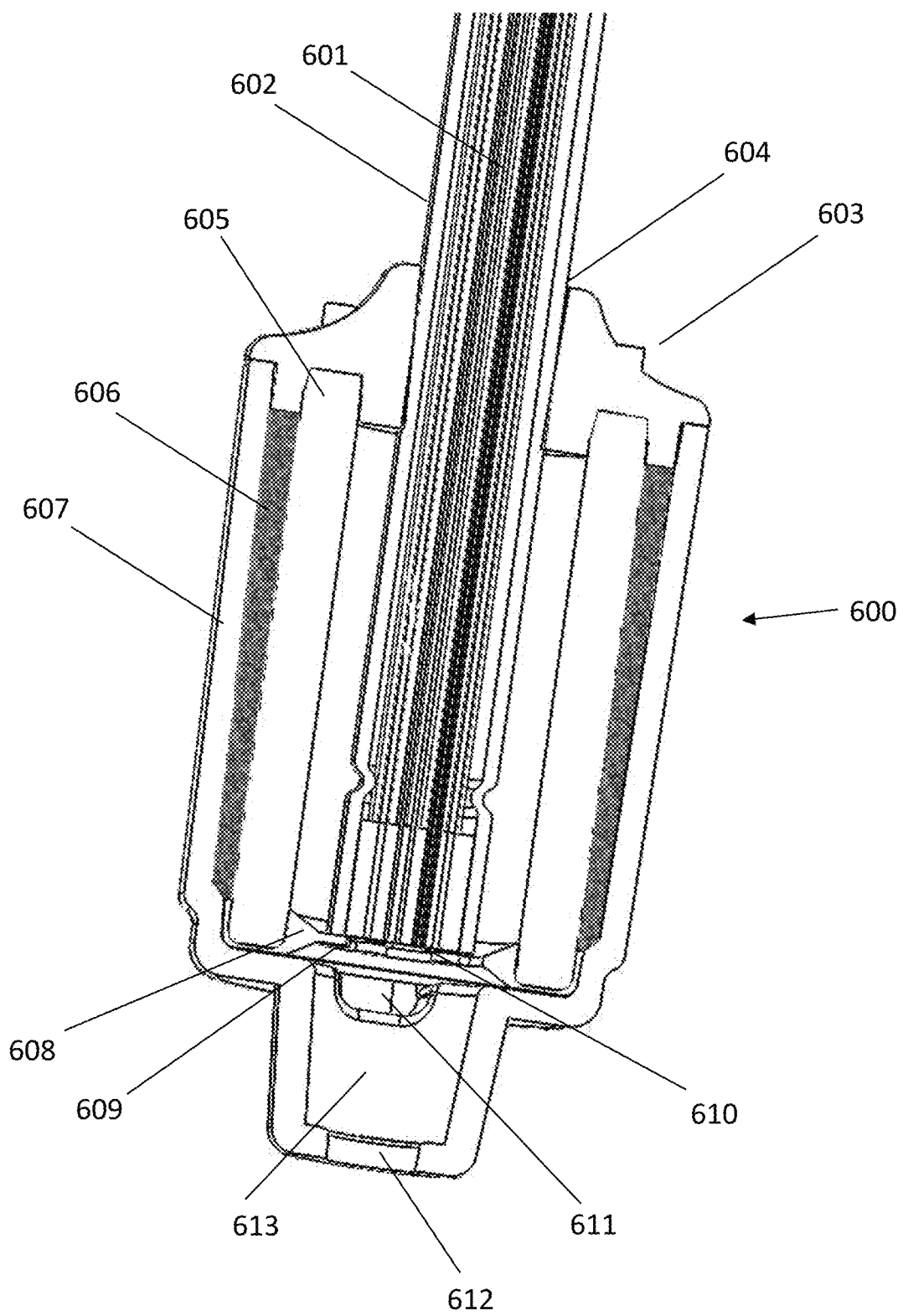
FIG. 6 shows a cross section view of a prefilter assembly, according to an exemplary embodiment of the present subject disclosure containing a filter aid.

It should be noted that flow path 513 may consist of a single flow path or multiple flow paths separate by support walls for bottom end-cap 505 and foil seal 506. Variations of the flow path 513 configuration to enable support of bottom end-cap 505 and foil seal 506 while providing a good flow through into outside annular space 510 will be understood and appreciated by those knowledgeable in the art. Further, it is important to note that bottom internal pocket 514 and internal pocket stop 515 design can be modified to provide varying degrees of tightness for the Concentrating Pipette Tip 501. Further, top port 512 may be manufactured from a soft rubber or elastomer or may contain one or more O-ring or other annular type seals for forming a tight seal around Concentrating Pipette Tip tube 501, while allowing for movement of Concentrating Pipette Tip tube 501. A range of seal types, designs, and materials to allow for sealing of Concentrating Pipette Tip tube 501 while still allowing for linear movement of said Concentrating Pipette Tip tube 501 will be understood and appreciated by those knowledgeable in the art. FIG. 6 shows an exploded view of an improved exemplary embodiment of the present subject disclosure. Prefilter 600 contains a filter aid 605 to improve filterability of difficult sample matrixes and removal of non-desirable sample constituents.

Prefilter 600 includes a top end-cap 603 with a seal 604 containing soft rubber, one or more O-ring or other annual sealing rings around Concentrating Pipette Tip tube 602 containing hollow fibers 601. Further, prefilter 600 contains filter 605, filter aid 606, housing 607, Concentrating Pipette Tip stop 608, bottom filter seal 609, Concentrating Pipette Tip inlet 610, flow path 611, and prefilter inlet 612.

A Concentrating Pipette Tip tube 602 is inserted into the top opening of top end-cap 603 where it is sealed by seal 604 until it touches Concentrating Pipette Tip stop 608. Concentrating Pipette Tip stop 608 includes one or more features that are designed to ensure that inlet 610 of Concentrating Pipette Tip tube 602 is the correct distance from foil seal 609.

Concentrating Pipette Tip stop 608 is used to correctly position inlet 610 of Concentrating Pipette Tip tube 602 in the range of 0.5 mm to 1 cm from the surface of foil seal 609, or more preferably between 1 mm to 5 mm from the surface. This distance creates a correctly sized flow path between the foil seal 609 and the opening of the Concentrating Pipette Tip 610 but is also far enough away from the foil seal 609 to keep the foil seal 609 from being stuck onto inlet 610 during operation. Correct sizing of this and other flow paths within prefilter 600 is needed to enable air present in the flow paths at the start of a sample processing run to be fully swept out and replaced by liquid, and for liquid present in the channels at the end of a sample processing run to also be fully swept out and replaced by air. It should be noted that the flow path dimension provided above are related to the currently available InnovaPrep Concentrating Pipette Tips which support flow rates of up to about 200 mL/min. As will be understood and appreciated by those knowledgeable in the art, significantly larger or smaller Concentrating Pipette Tips can be readily constructed and prefilters for these can also be constructed. As such, the flow path dimensions will also scale as the size of the Concentrating Pipette Tip is scaled.

Concentrating Pipette Tip stop 608, as described above, is used to correctly position opening 610 above foil seal 609 and to keep the tip from moving closer to foil seal 609 prior to or during sample processing. Concentrating Pipette Tip stop 608 is made up of a plurality of tabs that extend into the center hole of bottom filter seal 609. Concentrating Pipette Tip stop 608 can be produced from injection molding or other appropriate manufacturing techniques such as laser cutting from a plastic sheet, blow molding, roto molding and other techniques that will be well known to those knowledgeable in the art. The tabs that make up Concentrating Pipette Tip stop 608 are designed to stop the Concentrating Pipette Tip tube 602 from moving prior to or during operation, but bend or break, and thus allow Concentrating Pipette Tip tube 602 to be pushed down and through foil seal 509 and into the space directly above opening 612. This is performed by the user pushing down on the manifold head of the Concentrating Pipette instrument, which holds the Concentrating Pipette Tip, while housing 607 of prefilter 600 is pushed against the inside bottom of a final sample container. The tabs that make up Concentrating Pipette Tip stop 608 are designed to hold against a light downward pressure on the Concentrating Pipette Tip, but bend or break when a reasonable downward force is placed onto the Concentrating Pipette Tip while the prefilter 600 is held against the inside bottom of the sample container.

After breaking through foil seal 609, the Concentrating Pipette Tip tube 602 continues to travel down until it seals in an internal pocket at the bottom of enclosure 613. Enclosure 613 is designed such that after coming out of opening 610 of Concentrating Pipette Tip tube 602 elution fluid or wet foam then immediately comes out of opening 612.

The foil seal 609 can be produced from any number of commercially available pierceable foil seals and may be bonded to the bottom of the filter any number of methods that will be known by those skilled in the art. A partial listing of these processes includes, adhesives, ultrasonic, spin weld, thermal weld, vibrational welding, overmolding, and potting. Housing 607 and top-end cap 603 can be produced using standard injection molding processes or other manufacturing processes known by those skilled in the art.

Filter 605 can be a non-woven or fiber filter or may be of another filter type such as woven filter, membrane filter or a screen material. The fibers or materials can be a single material or multiple materials in a range of ratios. Appropriate materials include, but are not limited to, glass, quartz, metal, cotton, various cellulosic or other natural fibers, synthetic fibers including nylon, polypropylene, rayon, acrylic, polyolefin, aramide, polyester, polytetrafluoroethylene, or any number of materials commonly used if filter production. The filter 605 may contain a binder material or may be free of binder materials. The filter 605 can contain a support structure or be self-supporting and can be tubular in nature or may contain pleats. Further, filter 605 can be modified using known techniques to chemically or physically coat or impregnate the filters used in the assembly with filter aids such as diatomaceous earth, polyvinyl polypyrolidone, or other materials capable of capturing fouling materials or materials that are capable of causing inhibition in downstream assays. Further, it is possible that the interstitial space formed between housing 607 and filter 605 may be filled with a filter aid 606. Filter aid 606 can be selected from range of materials that will be well known to those skilled in the art. These include, but are not limited, to molecular sieve, silica gel, polyvinyl polypyrrolidone, diatomaceous earth, or other material to reduce fouling of the filter 605 and to reduce passage of natural organic matter, proteins, polysaccharides, humin, humic acids, fulvic acids and other small particles and compounds that can pass through the filter 605. These small particles may cause fouling of the filter 605 or the hollow fiber membrane filters 601 found in the Concentrating Pipette Tip, or they maybe be co-concentrated and cause issues with downstream assays.

Standard manufacturing techniques can be used for final assembly of prefilter 600. Filter 605 may be held in place and sealed within the assembly by pressure applied with the entire assembly is bonded together. Filter 605 may also contain "crush zones" at the end of the filter or may be plastisol-dipped or sealed at each end using a gasket material. Further the filter may be permanently bonded in place using an epoxy or other adhesive or an adhesive tape material. Finally, a "raceway" in the inside of housing 607 and top-end cap 603 can be used to provide a tight seal of the filter when the assembly is bonded together. Any method traditionally used for sealing tubular or round pleated filters, that will be well known to those skilled in the art, can be used to seal the filter 605 into the assembled prefilter 600.

Top-end cap 603 and housing 607 can be bonded together using any number of processes for bonding injection molded and extruded plastic components that will be known by those skilled in the art. A partial listing of these processes include, but are not limited to, adhesives, ultrasonic, spin weld, thermal weld, vibrational welding, overmolding, and potting.

To use prefilter 600, which is attached to a Concentrating Pipette Tip, the user inserts the Concentrating Pipette Tip into the Concentrating Pipette instrument as is normally performed. The prefilter 600, which is attached to the bottom end of the tip, is then lowered into a sample and the Concentrating Pipette instrument sample processing operation is initiated by the user. Upon initiation of a sample processing run, the sample is aspirated into prefilter 600 through bottom opening 612. The sample then flows through flow path 611 and through filter aid 606 then through filter 605 and down and in between the space formed between inlet 610 and foil seal 609 before entering inlet 610. Particles and other materials are removed as the sample flows through filter aid 606 and filter 605. Target particles and other smaller particles are then captured in the lumen of hollow fibers 601 in the Concentrating Pipette Tip tube 602.

After the entire sample has been processed and the sample processing run has been stopped by the Concentrating Pipette instrument, the user pushes firmly on the head of the Concentrating Pipette instrument which causes the bottom tip of the Concentrating Pipette Tip to break through foil seal 609 and seal inside of walls of enclosure 613 just above bottom opening 612. In this position, the user may then initiate an elution of the Concentrating Pipette Tip using the standard Concentrating Pipette instrument process. Upon initiating the elution, wet foam is push down the lumen of hollow fiber membrane filters 601 within the Concentrating Pipette Tip tube 602, recovering captured particles and being dispense out of bottom opening 612.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A device, comprising:
   a housing comprising an opening at a bottom end of the housing for aspirating a fluid sample through the opening and a port positioned at a top end of the housing, the port allowing for insertion and sealing of a tubular object or a pipette tip into the housing;
   a filter positioned within the housing;
   a tubular object or pipette tip inserted through the port and into the housing creating a first flow path enabling aspiration of a fluid sample through the opening at the bottom end of the housing and flow of the fluid sample through the filter and into the tubular object or pipette tip; and
   a second flow path enabling the fluid sample to dispense from the tubular object or pipette tip and out of the opening at the bottom of the housing without flowing through the filter;
   wherein the first flow path is bypassed and the second flow path is used by breaking a foil seal in the housing using the tubular object or a pipette tip.

2. The device in claim 1, wherein the tubular object or pipette tip comprises a tube of a pipette tip.

3. The device in claim 1, wherein a plurality of particles in the fluid sample aspirated via the opening at the bottom of the housing are captured within the tubular object or pipette tip and the particles are then dispensed through the second flow path.

4. The device in claim 1, wherein a plurality of particles in the fluid sample aspirated via the opening at the bottom of the housing are captured within a pipette tip inserted through the port and the particles are then dispensed through the second flow path.

5. The device in claim 1, wherein the foil seal is broken by pushing down on the tubular object or pipette tip.

6. The device in claim 1, wherein the sample is processed through the filter to remove fouling materials or materials that may be co-concentrated by a tubular object inserted through the port.

7. The device in claim 1, wherein the sample is processed through the filter to remove fouling materials or materials that may be co-concentrated by a pipette tip inserted through the port.

8. The device in claim 1, wherein the tubular object or pipette tip inserted through the port seals off the first flow path after the fluid sample has flowed through the filter.

9. The device in claim 1, wherein a granular or particle-type filter aid is included in the first flow path.

10. The device in claim 9, wherein the filter is modified or coated with one or more of the following: diatomaceous earth, polyvinyl polypyrrolidone, molecular sieve, silica gel, perlite, cellulose, clay, or cotton fiber.

11. The device in claim 1, wherein the tubular object comprises a concentrating pipette tip.

12. The device in claim 11, wherein the foil seal is adapted to be broken by the concentrating pipette tip inserted through the port.

13. The device in claim 1, where the filter is made up of one or more of: nonwoven filter, membrane filter, depth filter, airlaid, drylaid, melt spun, spunbond, meltblown, web spinning, wetlaid, and composite structures.

14. The device in claim 13, wherein the filter contains a binder resin or resins.

15. The device in claim 13, wherein the filter is constructed from one or more of glass fiber, quartz fiber, cellulose, polyester, polypropylene, polyethylene, polyamides, polyimides, acrylics, mixed cellulose esters, cellulose acetate, cellulose nitrate, polyethersulfone, polysulfone, polypropylene, polyacrylonitrile, hydrophilic polydivinylidene fluoride, polytetrafluoroethylene, Polyethylene terephthalate, polyethylene, polyester, polyimide, stainless steel or ceramics.

16. The device in claim 13, wherein the filter is hydrophobic.

17. The device in claim 13, wherein the filter is hydrophilic.

18. The device in claim 13, wherein the filter is coated with a filter aid material.

19. The device in claim 18, wherein the filter is coated with one or more of the following: diatomaceous earth, polyvinyl polypyrrolidone, molecular sieve, silica gel, perlite, cellulose, clay, or cotton fiber.

* * * * *